(12) United States Patent
Schoeren et al.

(10) Patent No.: US 9,764,348 B2
(45) Date of Patent: Sep. 19, 2017

(54) PLAY FOUNTAIN

(75) Inventors: Hubertus Johannes Bernardes Schoeren, Malden (NL); Wilhelmus Adolfus Johannes Marie Hoeks, Baarn (NL); Frits Jan Van Kempen, Amsterdam (NL)

(73) Assignee: ICE-WORLD HOLDING B.V., Baarn (NL)

( * ) Notice: Subject to any disclaimer, the term of this patent is extended or adjusted under 35 U.S.C. 154(b) by 522 days.

(21) Appl. No.: 13/806,785

(22) PCT Filed: Jul. 4, 2011

(86) PCT No.: PCT/EP2011/003305
§ 371 (c)(1),
(2), (4) Date: May 2, 2013

(87) PCT Pub. No.: WO2012/003951
PCT Pub. Date: Jan. 12, 2012

(65) Prior Publication Data
US 2013/0214056 A1 Aug. 22, 2013

(30) Foreign Application Priority Data
Jul. 4, 2010 (NL) .................................... 1038081

(51) Int. Cl.
*B05B 17/08* (2006.01)
(52) U.S. Cl.
CPC .................................... *B05B 17/08* (2013.01)
(58) Field of Classification Search
CPC ...... B05B 17/08; B05B 17/085; A63G 31/007

USPC .............................. 239/17–23; 472/118, 128
See application file for complete search history.

(56) References Cited

U.S. PATENT DOCUMENTS

| 4,088,880 | A | 5/1978 | Walsh |
| 4,892,250 | A * | 1/1990 | Fuller et al. .................... 239/18 |
| 5,439,170 | A | 8/1995 | Dach |
| 6,758,231 | B1 * | 7/2004 | Lochtefeld ............... A63G 3/00 104/70 |
| 7,341,203 | B1 | 3/2008 | Yeomans et al. |
| 7,748,642 | B1 | 7/2010 | King |
| 2003/0073505 | A1 | 4/2003 | Tracy |
| 2004/0020999 | A1 | 2/2004 | Beidokhti |

(Continued)

FOREIGN PATENT DOCUMENTS

| CA | 2397577 A1 | 10/2000 |
| CA | 2390240 | 12/2003 |

(Continued)

OTHER PUBLICATIONS

International Search Report, mailed Mar. 5, 2012 in connection with International Application PCT/EP2011/003305.

(Continued)

*Primary Examiner* — Christopher Kim
(74) *Attorney, Agent, or Firm* — Steven M. Koehler; Westman, Champlin & Koehler, P.A.

(57) ABSTRACT

The invention relates to an assembly, in particular a play fountain, comprising a floor (1), a plurality of nozzles (2), preferably a reservoir for a liquid, in particular water, or means to connect the assembly to a liquid supply, and a control system (3) for controlling one or more of the nozzles (2) during operation of the assembly. The floor (1) is assembled modularly.

22 Claims, 9 Drawing Sheets

(56) References Cited

U.S. PATENT DOCUMENTS

| | | |
|---|---|---|
| 2005/0248935 A1 | 11/2005 | Strip et al. |
| 2006/0175424 A1 | 8/2006 | Tatum et al. |
| 2007/0093306 A1 | 4/2007 | Magee et al. |
| 2008/0054088 A1 | 3/2008 | Hanke et al. |
| 2008/0191053 A1 | 8/2008 | Liao |
| 2011/0174897 A1 | 7/2011 | Mai |
| 2011/0267803 A1 | 11/2011 | Farrer |
| 2013/0214056 A1 | 8/2013 | Shoeren et al. |
| 2013/0320107 A1 | 12/2013 | Yeiser |

FOREIGN PATENT DOCUMENTS

| | | |
|---|---|---|
| CN | 201399418 Y | 2/2010 |
| DE | 102007043021 A1 | 3/2009 |
| DE | 20 2009 007 786 U1 | 8/2009 |
| DE | 202009007786 | 8/2009 |
| EP | 0318410 | 5/1998 |
| EP | 1898087 A1 | 3/2008 |
| FR | 2874337 | 2/2006 |
| FR | 2902901 | 12/2007 |
| JP | 63283775 | 11/1988 |
| JP | 02132047 A | 5/1990 |
| JP | H03186373 A | 8/1991 |
| JP | 0532112 | 5/1993 |
| JP | 93-19820 | 7/1993 |
| JP | 6091063 | 4/1994 |
| JP | H04-82700 | 5/1994 |
| JP | H06-39155 | 5/1994 |
| JP | 250962 | 6/1996 |
| JP | 2001070852 A | 3/2001 |
| JP | 2002-301410 | 10/2002 |
| WO | 2009033685 | 3/2009 |
| WO | 2009033685 A1 | 3/2009 |
| WO | 2012003951 A2 | 1/2012 |

OTHER PUBLICATIONS

Dutch Search Report, mailed Apr. 13, 2011 in connection with Dutch Patent Application NL 1038081.

Chinese Office Action for corresponding foreign Chinese Application No. 201180033307.6 dated Dec. 31, 2014.

Chinese Office Action for corresponding Chinese application No. 201180033307.6 filed Jul. 4, 2011, mailed Jan. 23, 2015.

Notice of Reasons for Rejection for foreign corresponding Japanese Application No. 2013-517096, drafted Jun. 19, 2015.

Chinese Office Action for Chinese patent application No. 2011800333076, dated Apr. 28, 2016.

English translation of Office Action for Mexican Patent Application No. MX/a/2013/000124, dated Nov. 5, 2015, 6 pages.

English translation of Office Action for Mexican Patent Application No. MX/a/2013/000124, dated Mar. 2, 2015, 7 pages.

\* cited by examiner

PLAY FOUNTAIN

PRIORITY CLAIM(S) AND/OR CROSS REFERENCE(S) TO RELATED APPLICATION(S)

This application is a national stage application under 35 U.S.C. §371 of PCT/EP2011/003305, filed Jul. 4, 2011, published as WO 2012/003951 A2 on Jan. 12, 2012, and claiming priority to Dutch Application No. 103808, filed Jul. 4, 2010, which applications and publications are incorporated herein by reference and made a part hereof in its entirety, and the benefit of priority of which is claimed herein.

The invention relates to an assembly comprising a floor, a plurality of nozzles, and a control system for controlling one or more of the nozzles during operation of the assembly.

Such a assembly is known and is used, for example, as city- or play fountain. The jets are accommodated in the floor of the assembly and are arranged to jet the liquid up into the air, which liquid jet is turned on and off or controlled by means of an hydraulic control valve. The liquid thus jetted upwards will as a result of gravity of course fall down again. The floor further is provided with drainage holes or -channels, that lead to a reservoir of the assembly. The liquid that is collected in the reservoir can be fed back to the jets by means of a pump and a network of conduits, operated or controlled by the control valve. Rain or drinking water is used as liquid mostly, in which case it is possible to connect the assembly to a water mains and optionally to allow the liquid jetted upwards simply to flow away.

With such an assembly a lively and variable and thus fascinating and visually attractive appearance or show can be realised, to which end the various liquid jets are turned on and off by means of one or more control valves in accordance with a specific patron and/or rhythm and possibly even varied in height. On summer days, such an assembly will treat possible visitors, hereafter referred to as users, in addition to relaxation and entertainment also to cooling.

It is an object of the invention to expand the versatility of the known assembly.

To this end, the floor is assembled modularly. In an embodiment, the floor comprises a plurality of mutually detachable floor modules. In a further embodiment, the assembly is mobile, i.e. able and intended to be moved from one location to the next, e.g. from a village or city square to a fairground.

Owing to the modularity, the play fountain can be installed temporarily, e.g. during events or for a few months in summer, and the size and shape of floor becomes flexible, e.g. may comprise only three rows and columns, 3×3, with one nozzle in each module or be considerably larger comprising twenty rows and columns, 20×20, with e.g. four, five, or nine nozzles in each module. Configurations can be easily adapted to space available and to the wishes of the users.

In an embodiment, at least a plurality and preferably all nozzles of the assembly are supplied with liquid via an individual and preferably individually controllable pump. It is preferred that each individual floor module comprises at least one nozzle and/or at least one pump.

This embodiment is based on the insight and experience that with such an arrangement of the assembly the liquid jet can be controlled easier and quicker for each nozzle than when a plurality of nozzles are supplied with liquid in common by means of a single pump. In this respect, it is advantageous when the pumps are provided with a electric drive (motor) and/or that the pumps, at least during operation of the assembly, are driven or energised continuously and that the height of the liquid jet is controlled by energising the pump to a greater or lesser extent.

In an embodiment, a reservoir is positioned, in vertical direction, directly below the pumps. It is preferred that the reservoir extends beneath all pumps of the assembly and/or beneath the entire floor. Thus, the individual pumps need only suck the liquid from the reservoir and deliver it to the nozzles over a relatively short distance, which again benefits the speed at which the liquid jet can be controlled for each nozzle.

In another embodiment, the nozzles are positioned just below the (upper) surface of the floor and are operated to continuously jet an amount of liquid, at least during use of the assembly. In this embodiment, liquid flow can be controlled more easily and quickly than when it must be turned on or off. The vertical distance between the nozzle and the surface of the floor is, in that case, at least equal to or greater than the smallest height of the liquid jet jetted through the nozzles. This embodiment can be carried out in different ways. First of all, it is possible that the nozzle continuously jets a liquid jet, which is capable of reaching above the floor and that this liquid jet can be selectively aimed downwards (to the ground) or upwards (through the floor) or deflected. To this end, the jet can e.g. be rotatably mounted in the assembly or the assembly can be provided with a liquid jet deflection means that can be positioned selectively between the nozzle and the surface of the floor. It is also possible that the nozzle is supplied with liquid via a continuously operating pump and that the liquid jet is controlled by driving or energising the pump to a greater or lesser extent. Finally, it is, in this respect, possible to supply the nozzle with liquid via a flexible conduit and control the liquid jet by throttling the conduit to a greater or lesser extent, for example by means of an electromagnet that can be energised selectively.

In another embodiment, the nozzles are supplied with liquid from a pressurised central liquid storage, such as an accumulator or elevated tank. Use of such a liquid storage is advantageous because thus the liquid can be supplied to the nozzle under a constant pressure, more independent of the number of nozzles in operation, which enables a fast and reliable control of the nozzles.

In a further embodiment, the assembly is provided with a ceiling positioned, in vertical direction, above the floor, and in which the nozzles are accommodated. The nozzles in the ceiling are arranged to let through or jet the liquid downward in the direction of the floor. The vertical distance between the ceiling and the floor of the assembly is for example 2.2 meters, so that the user can go between them. The floor can be provided with openings, that lead to the reservoir of the assembly underneath the floor. By means of a pump and corresponding conduits the liquid collected in the reservoir can be supplied to and through the nozzles once again. As an advantageous alternative, it is possible to provide a liquid basin above the ceiling, from which the nozzles are supplied with liquid. A single pump with which the liquid can be pumped from the reservoir underneath the floor to the basin above the ceiling can suffice this alternative embodiment of the assembly.

In another embodiment, the liquid is mixed with air upstream from or in the nozzle. Means suitable to that end, such as a specifically constructed nozzle, are available as such. This last measure enables realising clearly detectable liquid jets with a relatively small amount of liquid. Such relatively small amounts of liquid can be switched faster with the same means in comparison to larger amounts of liquid.

In a further embodiment, the nozzles are provided in a two-dimensional pattern, such as a regular triangular or square grid. This enables that the play fountain according to the invention generates relatively complex shapes, i.e. the nozzles in the floor can be considered pixels of an image built up of a large number of pixels or nozzles. The nozzles of the assembly can be at least turned on or off by means of the control system, but it is preferred that the control system can also control the 'intensity' of the pixel, i.e. the height of the liquid jet for each nozzle.

In an embodiment, the control system is arranged to jet liquid from the nozzles to generate a moving wall, as explained in the examples below, or a combination of static features, such one or more 'fixed' walls of liquid jets, and dynamic features, such as a pac man, snake or said moving wall, moving relative to the static features.

In another embodiment, the control system is arranged to jet liquid from the nozzles to generate a partial or entire enclosure, such as an at least partially surrounding wall.

In an further embodiment, the control system is arranged to limit the maximum number of nozzles that is activated simultaneously. Thus, electrical power consumed by the play fountain can be controlled and maintained below a selected threshold.

In a further embodiment, the assembly comprises a plurality of loose or at least mutually detachable tiles, each preferably accommodating at least one nozzle. It is preferred that the tiles are not completely flat, but are shaped at least somewhat conically, such that the (fallen down) liquid will flow to the edges or, rather, to the centre of the tile, from where it can flow to the reservoir via a mentioned drainage hole or conduit.

It is preferred that the tiles are provided with a hole, at least in its centre, accommodating a nozzle that is supplied by a pump that is fixedly or detachably connected to the tile and of which a suction extends substantially vertically downwards into the reservoir of the assembly. It is preferred that the tiles in the assembly are at least mutually and at least horizontally fixed, for example by means of a supporting frame wherein for each tile a recess is provided that is adapted to the circumference thereof. It is preferred that the tile and/or the frame is provided with adjusting means, with which it can be adjusted to be accurately horizontal or with which the liquid jet can be adjusted to be accurately vertical. The tile and/or frame can further be provided with connecting means, with which the tile or the frame in the assembly is connected each time to one or more adjoining tiles or frames.

The preferred measures described in the preceding paragraphs each separately and in combination contribute to the applications and in some cases also to the ease with which the assembly according to the present invention can be moved, installed and/or used.

A further embodiment provides the option of interaction between the assembly and the user(s) thereof.

According to the invention such goal can be achieved by, e.g.
firstly, providing the assembly with one or more sensors, such as a pressure sensor to detect the presence of a user or, in general, an object, on the floor; and
secondly, controlling the amount of liquid that is let through or jetted from at least one of the nozzles, in dependence of the sensor(s).

These measures enable the user of the assembly according to the invention to interact with it, or influence the operation or at least the external appearance thereof. Thus, the possibilities of use and aesthetics of the assembly are increased significantly in a surprisingly simple manner. The latter assembly according to the invention can simulate more complex (computer) games, like tag, bowling or tennis, at least inasmuch the control system is arranged or programmed for that.

Preferably, the sensor is not only arranged for detecting the presence of the object or the user on the floor of the assembly, but, e.g. also its position. It is also preferred that the assembly is provided with a separate sensor for each nozzle, or at least with detection means allocated to that specific nozzle. Such a sensor can simply be realised by providing the floor resilient in vertical direction such that it will flex locally due to the weight of an object present on it. This flexing of the floor can, e.g. generate an electrical signal, but it can also be used to block the liquid supply to the respective nozzle, such as when this supply occurs via a flexible hose which hose is throttled by the said flexion. On the one hand side the throttling influences of course directly (the height of) the liquid jet, but on the other hand the rotational speed will differ thereby which is easily detectable by the control system. Of course a comparable operation is also achieved if the flowing out of the liquid jet is (partly) blocked by the object to be detected itself.

For the sake of completeness, attention is drawn to the following prior art.

FR 2 874 337 discloses a fountain having a water reservoir disposed beneath a set of dismountable photovoltaic modules (40-57, 60-71), and a pump and/or water reservoir access unit. The modules entirely cover the water reservoir. Multiple pumps are supplied with electricity produced by the photovoltaic modules. A slit (85) provided between the modules (54, 55) permits water to flow between them for collecting and transporting in the reservoir. The fountain may be provided with audio reproduction equipment.

EP 318 410 relates to a "cybernetic ornamental fountain which includes various water output nozzles, a system to control its flow and complementary decorative and spectacular elements, there being associated with each nozzle a valve (T) formed by a cylindrical plug sliding in a valve passage orifice and an electromagnetic control system that comprises a ferromagnetic core and an annular electromagnetic coil."

U.S. Pat. No. 5,439,170 relates to an illuminated water fountain, which includes an assembly of water lines each carrying a plurality of water discharge nozzles to produce a pattern of water discharges, and a control system for controlling water valves and an illumination system in accordance with musical sounds.

EP 1 898 097 relates to a pump comprising an impeller and an electric motor, accommodated in a housing. Control and governing electronics for the electric motor is arranged in the housing and comprises a speed detection device, a microprocessor and a data storage device. EP 1 898 097 further discloses a water display device comprising several water jets.

US 2003/0073505 discloses an interactive fountain suitable for installation in a spray or water park partially submerged in a swimming or wading pool. The fountain includes a body having an upper surface sized to support at least one user in a position standing or sitting thereon. The support structure may be formed in situ, or preformed off-site from precast materials. Two or more water nozzles are positioned within the support structure.

JP 63 283775 relates to "a water wall as a door into a building or the like and to impart an attractive scene by providing the water wall in a passage and also opening one part of the water wall corresponding to the passenger in case a person or an object passes through it."

The invention will be explained in more detail hereinafter by means of the Figures.

Figure 1:
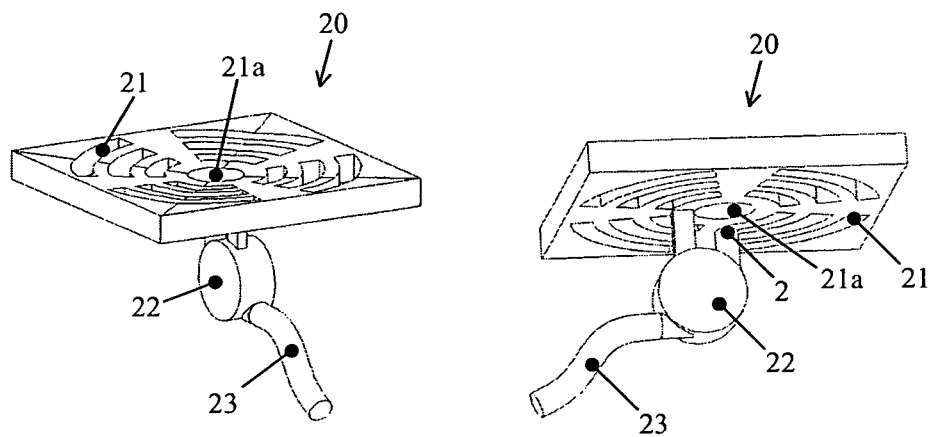
FIG. 1 represents two views of a schematically depicted tile module for an assembly according to the invention.

FIG. 1 represents two views of a floor module 20, tile 20 in short, according to the invention for an assembly of a floor 1, a plurality of nozzles 2 and a control system 3 (see FIG. 4) for controlling an amount of liquid 4 or liquid jet 4 (see FIG. 4), let through or jetted by all or a plurality of nozzles 2 of the assembly together or by each individual nozzle 2. The tile 20 is provided with drainage holes 21 for letting through liquid 8 in vertical direction (see FIG. 4), including the vertically upwards directed liquid jet 4, which in this example can be generated by a pump 22 mounted to each individual tile 20. It is preferred that the tiles 20 are not entirely flat, but are shaped at least somewhat conically, such that the (fallen down) liquid 8 will be collected along the edges or, on the contrary, to the centre of the tile, from where it can flow away via a drainage hole 21.

The liquid jet 4 let through by the nozzle 2 can jet through a drainage hole 21a, preferably provided in the centre of the tile 20. To this end, the pump 22 is, of course, provided with a supply for liquid 8, such as a supply conduit 23. The pumps 22, or at least the liquid jets 4 generated thereby, are each individually controlled, or at least energised, by a control system 3 (see FIG. 4).

Figure 2:
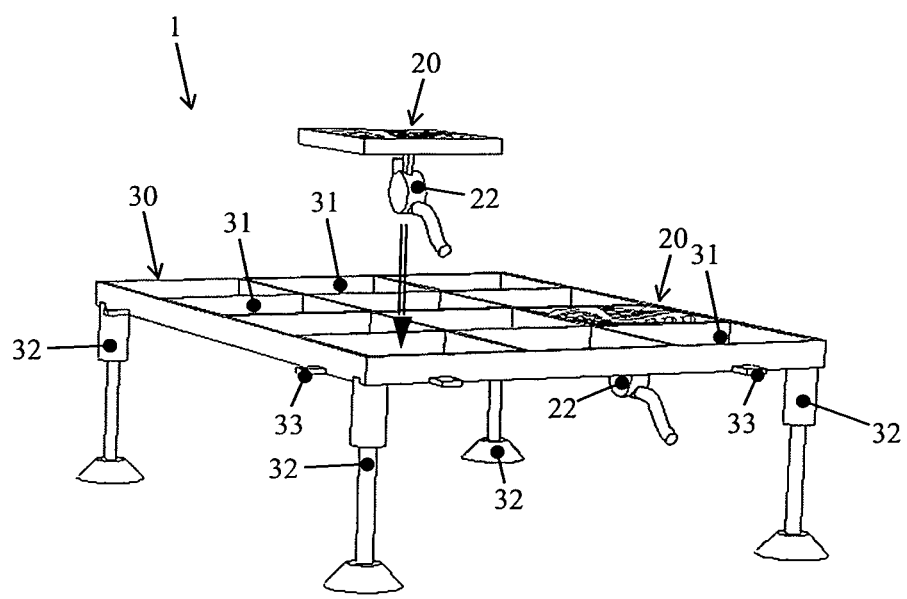
FIG. 2 shows schematically a frame intended for assembling from the tile modules according to the invention a floor of the assembly.

As shown in FIG. 2, the floor 1 of the assembly according to the invention can, with the aid of a frame 30, be built advantageously simply and quickly modularly from a plurality of the mentioned tiles 20. To that end, the frame 30 is provided with recesses 31 that are adapted to the circumference of the tiles 20. The frame 30 is further provided with legs that are adjustable for height, with which it can be adjusted to be accurately horizontal or with which at least the liquid jets 4 can be adjusted accurately vertical. The frame 30 is further provided with connecting means 33, with which it can be connected to an adjoining frame 30 within the assembly, to realise a greater surface of the floor 1.

Figure 3:
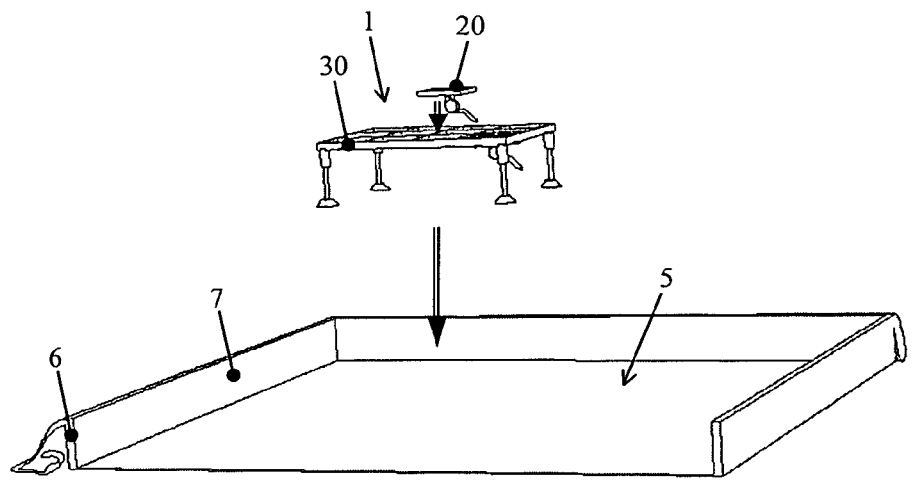
FIG. 3 shows schematically a liquid reservoir for an assembly according to the invention.

As shown in FIG. 3, the assembly according to the invention can be provided with a reservoir 5 filled with liquid 8. It is preferred that the floor 1 of the assembly is positioned in the reservoir 5 in its entirety, so that the reservoir 5 and the liquid 8 in it are located directly underneath the individual pumps 22 of the assembly. Thus, a pump 22 need only suck the liquid 8 from the reservoir over a relatively short distance and supply it to a respective nozzle 2. The reservoir 5 can advantageous be built simply from a circumference of four planks 6 placed in a rectangle, which are reinforced by beams placed at least at the corners of the rectangle and/or are interconnected and between which a synthetic or rubber sheet is placed.

Figure 4:
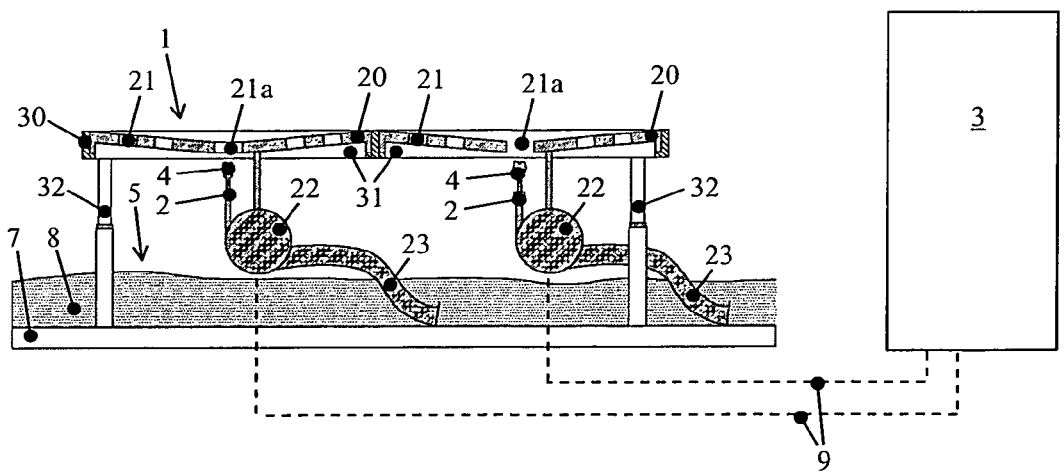
FIGS. 4 and 5 show schematically an example of the assembly according to the invention in cross-section and in mutually different operating conditions.
Figure 5:
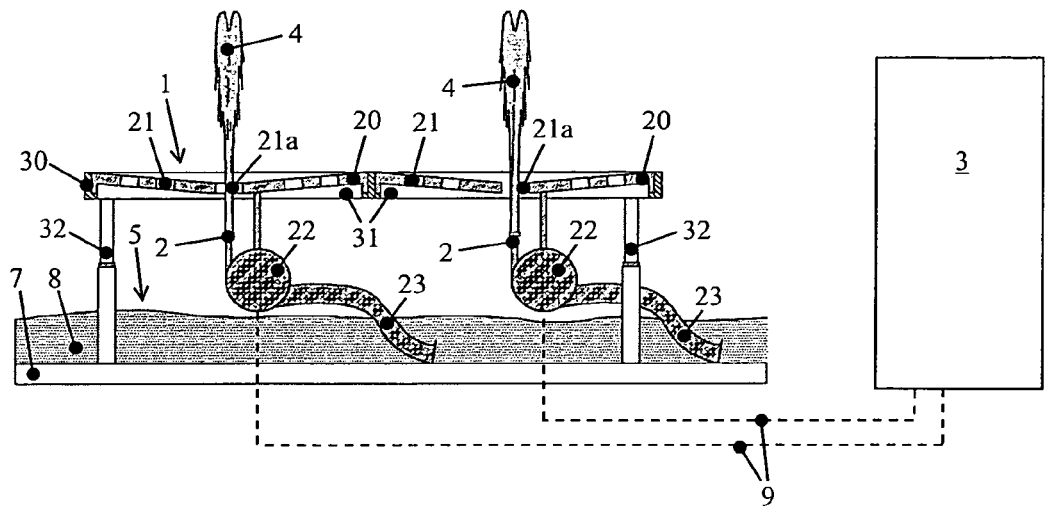

FIGS. 4 and 5 show the assembly according to the invention in FIGS. 1, 2 and 3, this time in cross-section and during operation. In FIGS. 4 and 5, the control system 3 of the assembly and the controlling and energising by it of the individual pumps of the assembly is depicted schematically. In conformity with the invention, the nozzles 3 are positioned just below the (top) surface of the floor 1 and continuously jet a liquid jet 4. By limiting the height of the liquid jet to below the floor 1 (see FIG. 4), it is, for the user, effectively switched off, which implies that the user can go over the floor 1 or at least the respective tiles 20 without getting wet. If, on the other hand, the respective pumps 22 are energised more by the control system 3, the water jets thereof can reach also beyond the floor 1.

Figure 6:
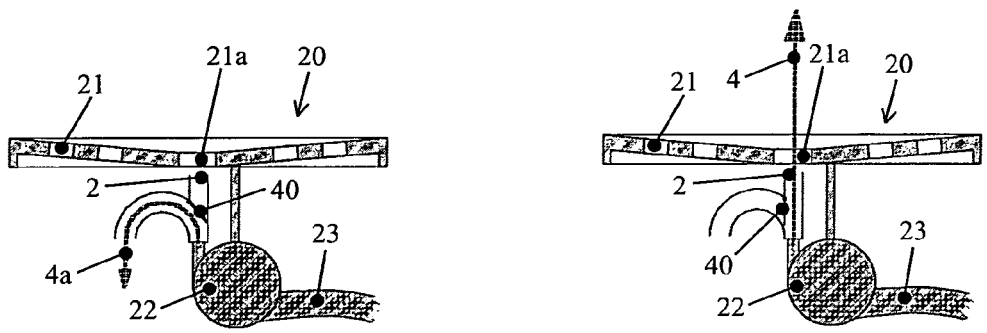
FIG. 6 shows schematically another example of the assembly according to the invention in cross-section with a movable baffle in two mutually different operating conditions.

An alternative configuration of the assembly for switching the liquid jet 4 on and off relative to the user of the assembly is illustrated in FIG. 6. According to this alternative configuration of the assembly according to the invention, the pumps 22 thereof can be energised constantly and for example maximally and the liquid jet 4 is switched (on and off) by selectively deflecting to the reservoir 5 (see FIG. 6; liquid jet 4a) the liquid flow 4, 4a generated by the pump 22 by means of a liquid jet deflection means 40 which is movable under the control of the control system 3, viz. in this example a movable baffle 40, or, on the contrary, jetting it unobstructed, as the liquid jet 4, vertically upwards through the drainage hole 21a in the tile 2.

Figure 7:
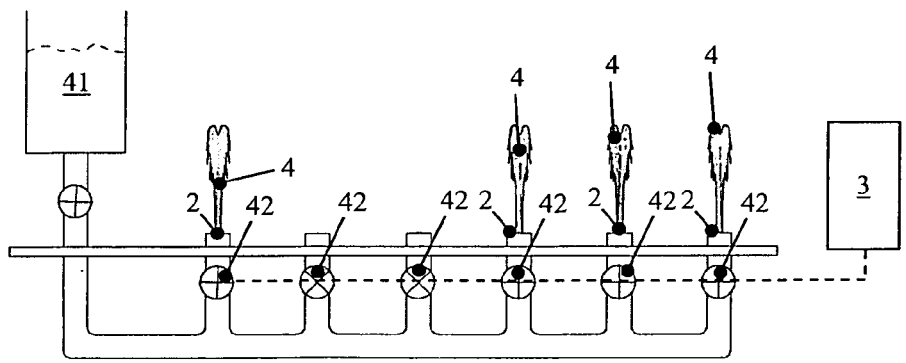
FIG. 7 shows schematically another example of the assembly according to the invention with a liquid storage.

Another alternative configuration of the assembly for switching the liquid jet 4 on and off relative to the user of the assembly is illustrated in FIG. 7. According to this alternative configuration of the assembly according to the invention it is provided with a pressurised liquid storage 41, viz. in this example a tank 41 placed higher than the height of the nozzles 2 or the liquid jets 4. From the tank 41 the nozzles 2 are supplied with liquid 8 and the height of the respective liquid jets 4 can be controlled by the control system 3, for example by (further) opening and closing of an individual electrically operated control valve 42 for each nozzle 2.

Figure 8:
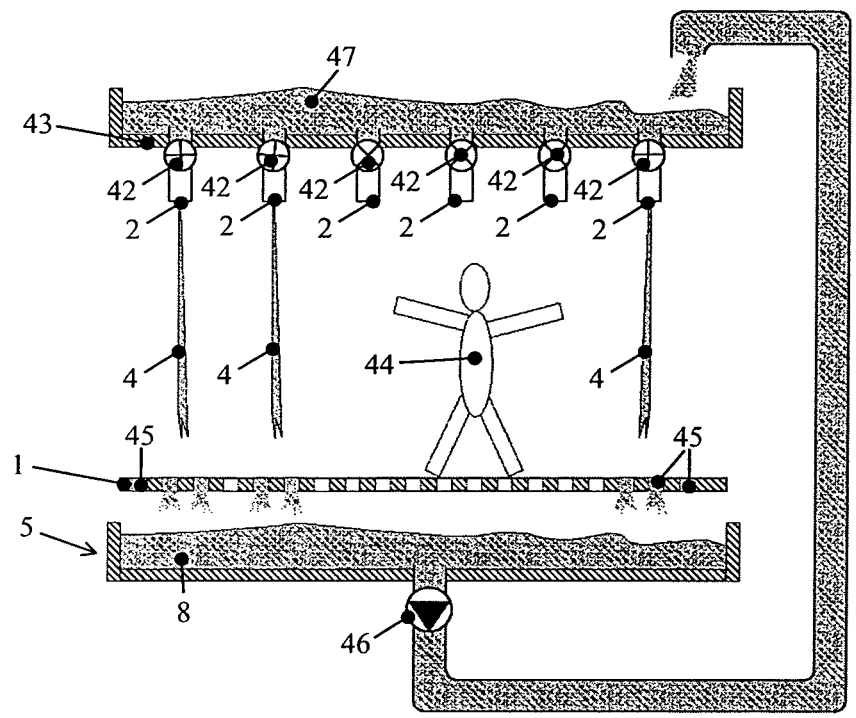
FIG. 8 shows schematically a third example of the assembly according to the invention with a ceiling.

Another alternative configuration of the assembly according to the invention is illustrated in FIG. 8. In this alternative configuration of the assembly according to the invention, it is further provided with a ceiling 43 positioned, in vertical direction, above the floor, and in which the nozzles 2 are accommodated. The nozzles 2 in the ceiling 43 are arranged to let through or not (e.g. by means of the abovementioned electrically operated control valve 42) the liquid downward in the direction of the floor 1. The vertical distance between the ceiling 43 and the floor 1 of the assembly is sufficient for an object 44, such as a human user 44, to go therebetween. The floor is provided with drainage openings 45, that lead to the reservoir of the assembly underneath the floor.

By means of a central pump 46 and corresponding conduits the liquid 8 collected in the reservoir 5 can be supplied to and through the nozzles 2 once again. To this end, a liquid basin 47 is provided above the ceiling 43, from which the nozzles are supplied with liquid.

Figure 9:
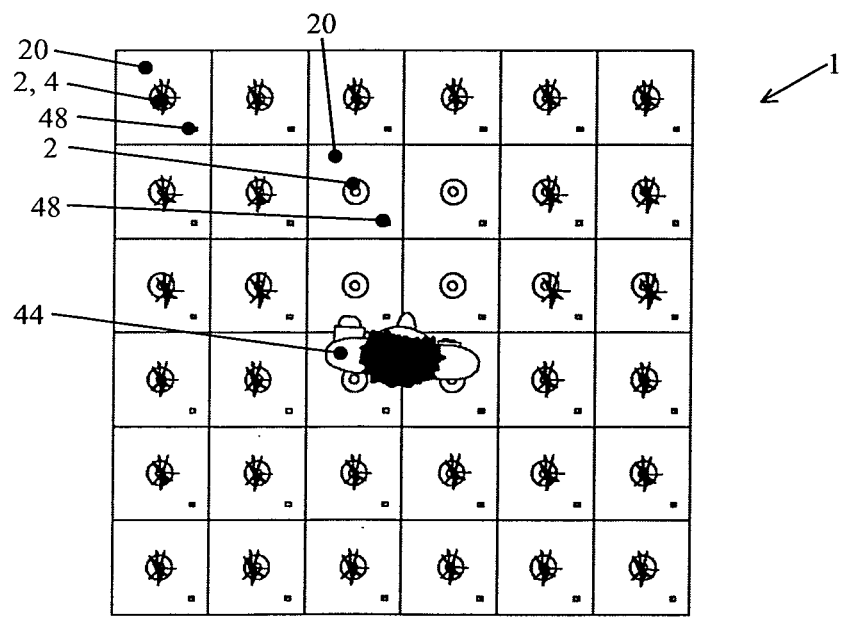
FIG. 9 shows schematically a third example of the assembly according to the invention with sensors.

Finally, a number of aspects of the invention are illustrated in FIG. 9. First, FIG. 9 depicts a preferred embodiment wherein the nozzles are provided in a two-dimensional array. This measure enables realisation of relatively complex shapes and games with the assembly. In that case, namely, the nozzles 2 in the floor 1 are seen and controlled as a pixel of a larger image. It is preferred that the array or at least the floor 1 is built up modularly, for example from the floor modules 20 mentioned earlier. Second, the versatility of the assembly according to the invention is increased to a considerable extent by providing it with sensors 48 for one, a plurality or all individual nozzles 2 of the floor 1. For example, the presence of a user 44 on a specific location on the floor 1 can be detected with the sensor 48, which information can be supplied to the control system 3, which in reaction to that can switch on or rather switch off the liquid jet 4 of specific nozzles 2 of the floor 1, for example in accordance with prescribed rules or rules of play programmed in the control system 3. Suitable sensors 48 to this end and for this application, such as proximity, pressure- or photosensitive switches or signal givers are generally known and available.

Figure 10:
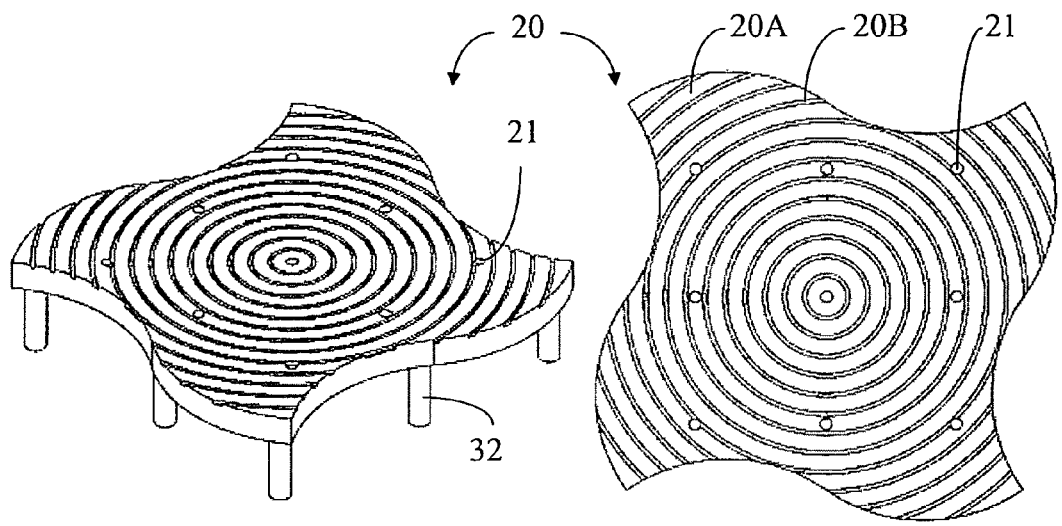
FIG. 10 show a perspective view and a top view of a floor module according to the present invention.
Figure 11:
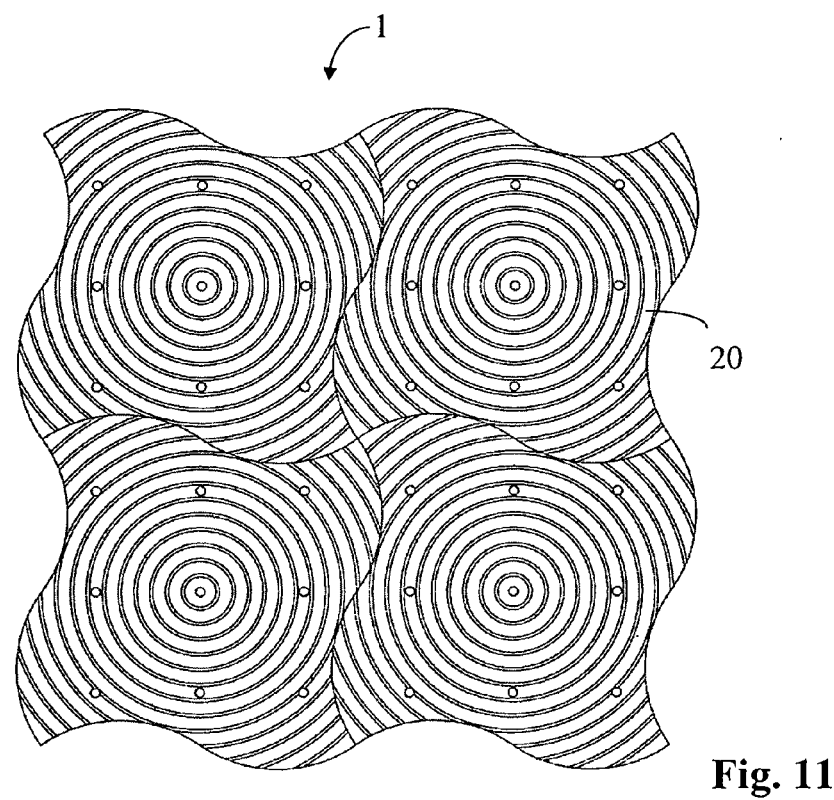
FIG. 11 shows a top view of part of a floor assembled from the floor modules according to FIG. 10.
Figure 12:
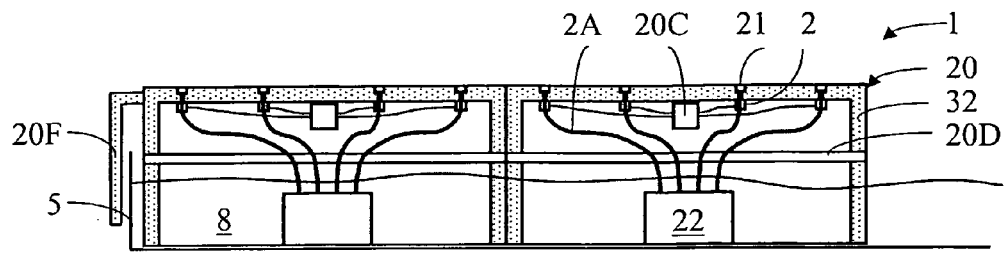
FIGS. 12 and 13 show schematically cross-section of play fountains according to the present invention.
Figure 13:
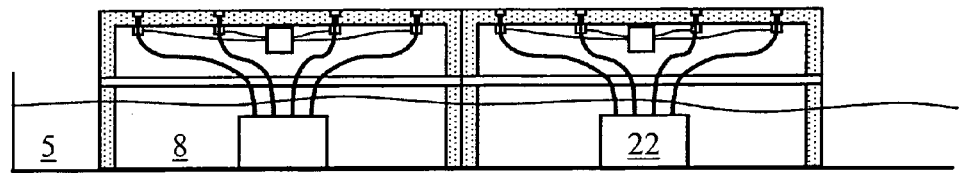
Figure 14:
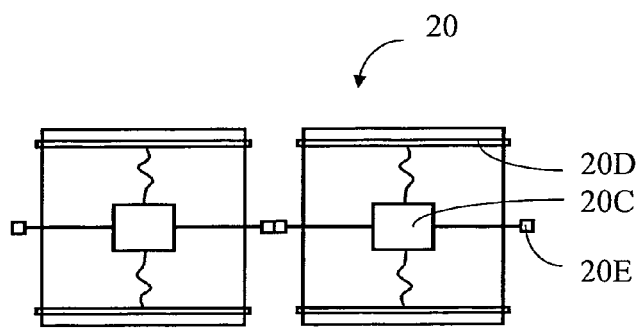
FIGS. 14 and 15 show a bottom view and a perspective view of floor modules according FIG. 13.
Figure 15:
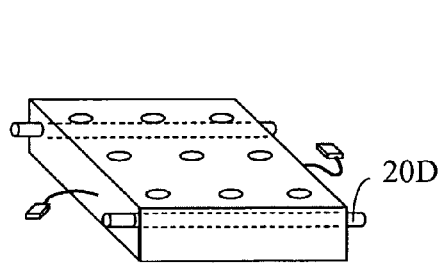
Figure 16:
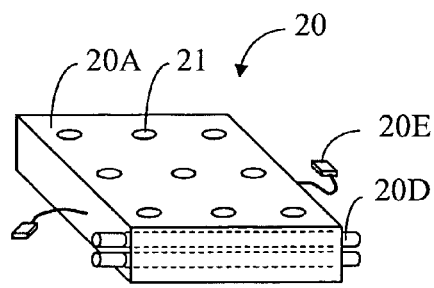
FIG. 16 shows a variation of the module shown in FIG. 15.

FIGS. 10 and 11 shows a further example of a floor module 20 according to the present invention. This module 20 comprises a top surface 20A for users, e.g. children, to walk and play on in the assembled floor (part of which is shown in FIG. 11), provided with openings for the liquid jets and with grooves 20B, e.g. formed as concentric circles, for collecting return liquid and provided with further (smaller) openings 21 to drain off the return liquid to a reservoir underneath. The top surface 20A is supported by a plurality of legs 32 and the sides of the modules are shaped as waves. The modules are manufactured e.g. by injection moulding a synthetic material, such as a plastic.

In this embodiment, and the embodiments shown in FIGS. 12 to 17, each module 20 comprises mechanical connectors, e.g. drop-in hooks or clips and receiving slots (not shown), to mechanically join the modules to form a floor 1 providing a surface for people to walk an play on.

Each module further comprises a plurality, e.g. nine, nozzles 2, a pump 22 for each nozzle, connected to a respective nozzle via a flexible tube 2A, optionally one more lights and one or more sensors, and a microcontroller 20C for receiving instructions from a control system 3/3A (FIG. 17) and for operating the pumps and, if present, the light(s) and/or the sensor(s). The modules each comprise at least two electric conductors 20D to supply electrical power to the pump, the microcontroller and, if present light(s) and sensor(s).

In this example, the conductors are provided in the form of power strips 20D and extend through and from the modules. The ends of the strips are provided with connectors, e.g. drop-in connectors, to serially connect the strips and establish conductors extending along an entire row or column of the assembly and connected to a common power supply 3B. Similarly, the microcontrollers 20C comprise two connectors 20E each to establish a data bus.

Figure 17:
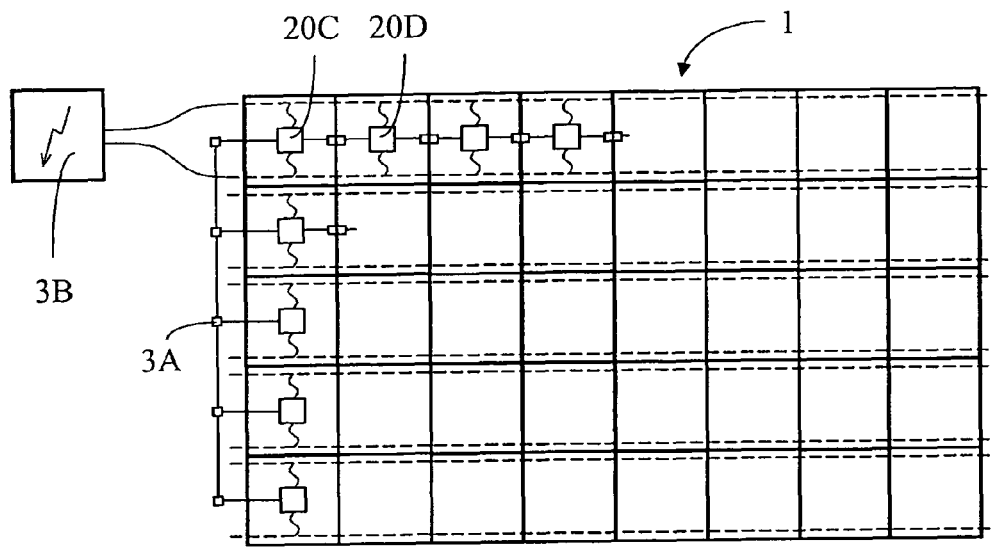
FIG. 17 shows a top view of a play fountain according to the invention comprising a grid of rows and columns of floor modules.

As shown in FIG. 17, the play fountain 1 comprises a plurality of rows and columns, e.g. 5×10, 10×10, 20×20 or 30×60. The number of configurations (R×C) and combinations of configurations, e.g. 5×5 and 10×10 connected by 2×4, is virtually unlimited.

Each row comprises a data bus and each data bus is connected to further microcontroller 3A. These microcontrollers 3A in turn are connected to a central controller (not shown). In this example, several programs are stored in the microcontrollers 3A of each row. The central controller instructs these microcontrollers 3A which program to run and these microcontrollers 3A in turn send instructions to the microcontrollers in each module 20.

In an alternative embodiment, the assembly comprises a wireless connection, e.g. wifi, between the microcontrollers in each module and one or more central controllers.

FIGS. 18 to 24 show various games that can be played with the play fountain according to the present invention.

Figure 18:
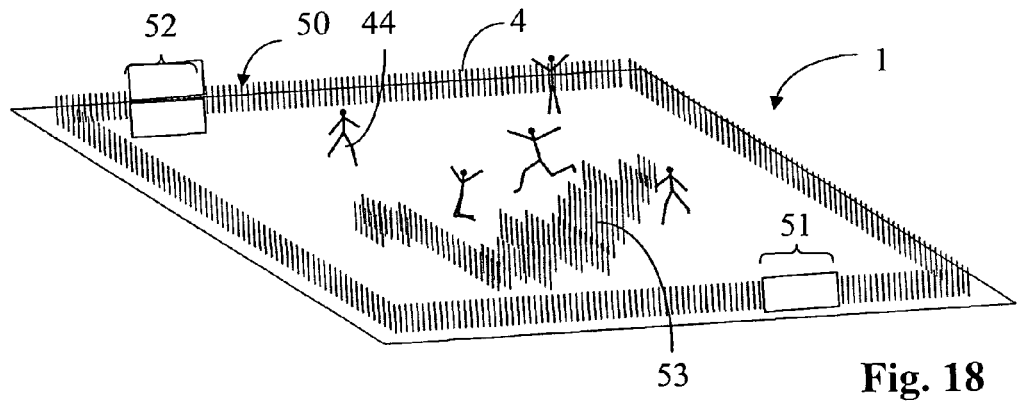
FIGS. 18 to 24 show various games that can be played with the play fountain according to the present invention.

In FIG. 18, liquid jets 4 define a static surrounding wall 50, an entrance 51 and an exit 52, along the circumference of the floor 1, as well as a dynamic feature, e.g. a snake 53, moving inside the wall. An example of an aim of this game could be to enter the floor at the entrance and try to cross the floor and leave via the exit without getting 'caught' by the dynamic feature.

Figure 19:
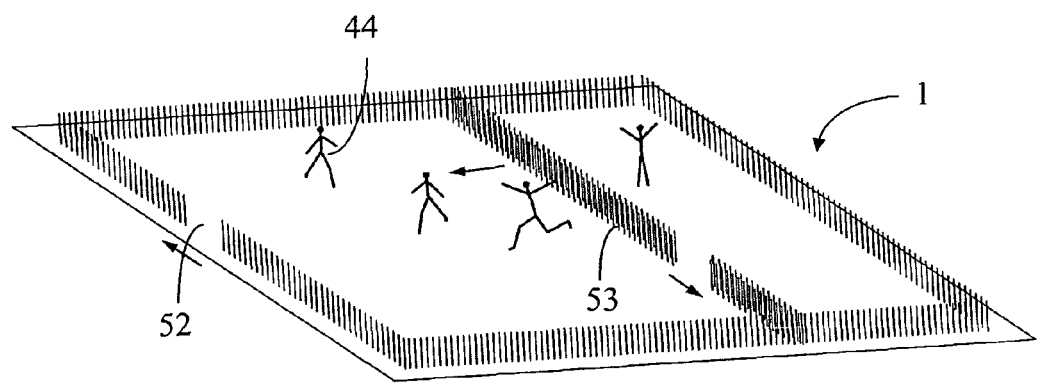
Figure 20:
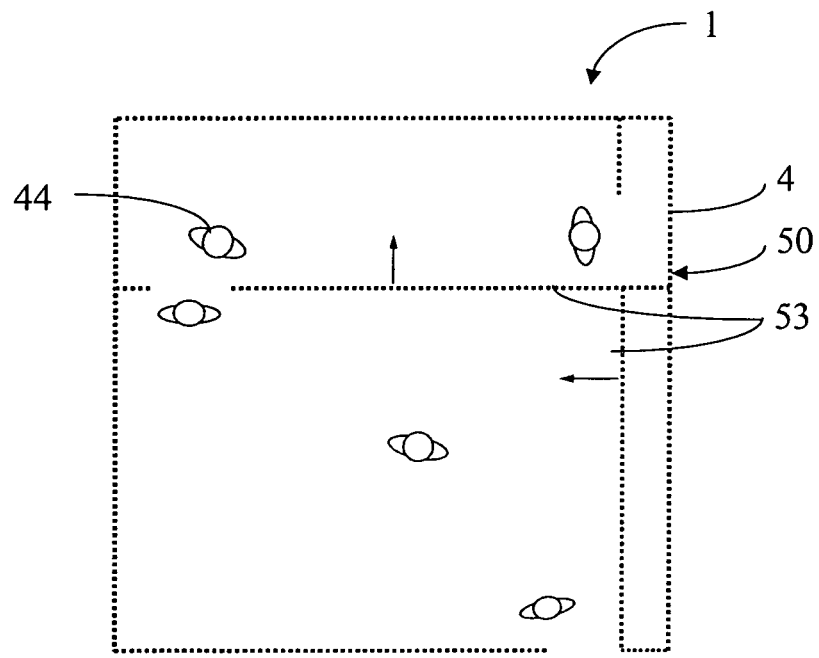
Figure 21:
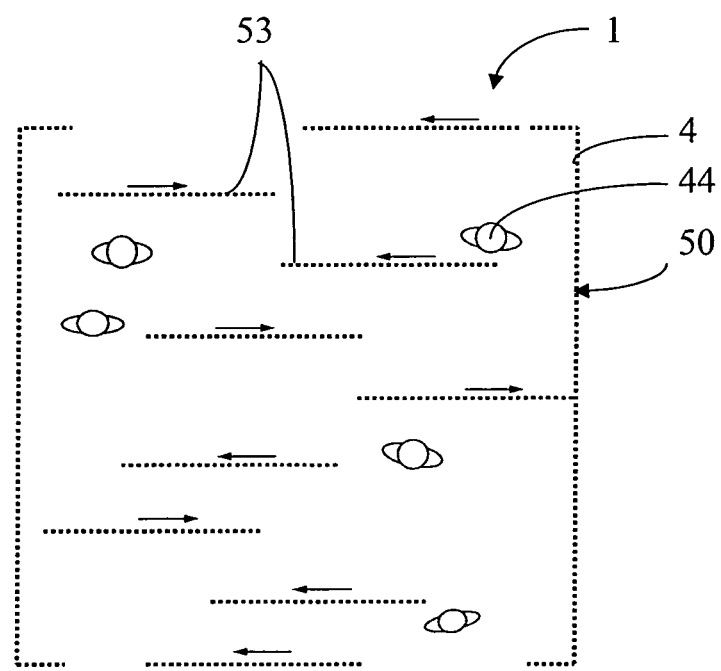

The game in FIG. 19 is similar, but in this example the dynamic feature is formed by a moving wall 53 comprising a moving door 53. Examples of an aim of this game include trying to reach the exit or stay on the floor for as long as possible, e.g. recording time lapsed, without getting wet. FIGS. 20 and 21 show more elaborate versions of the embodiment shown in FIG. 19, comprising multiple translating (FIG. 20) or sliding (FIG. 21) walls 53.

Figure 22:
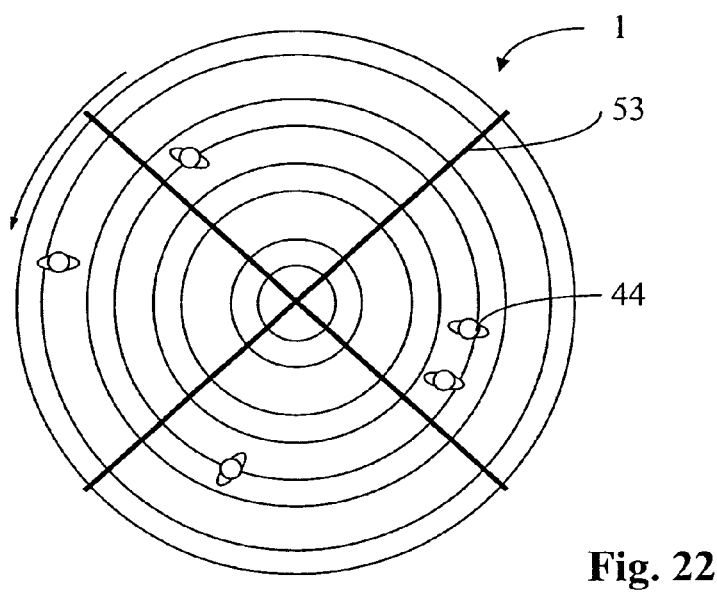

In FIG. 22, the liquid jets define at least one rotating wall, e.g. two rotating walls forming a cross when viewed from above, and are sufficiently low, e.g. in a range from 30 to 50 centimeters high, to allow users to jump over them. Rotating the walls provides a game similar to rope-skipping.

Figure 23:
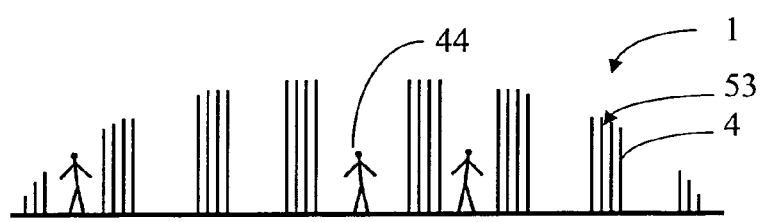
Figure 24:
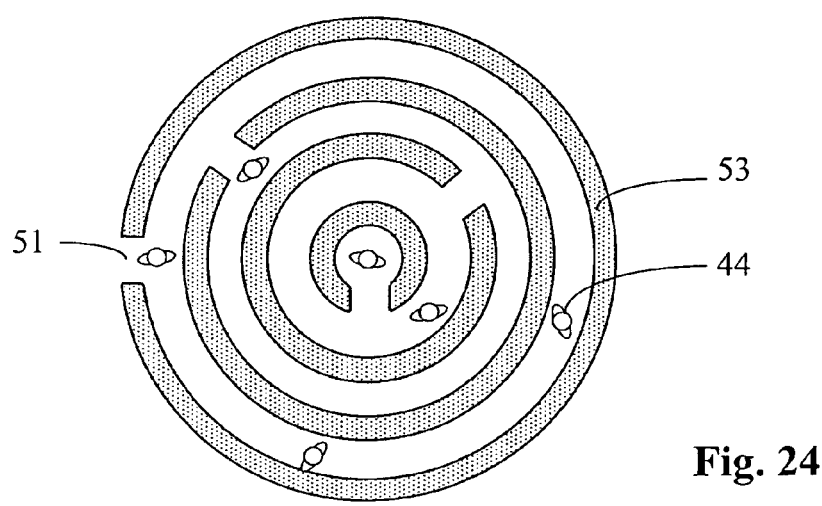

In FIGS. 22 and 23, the liquid jets define concentric walls, each provided with at least one dynamic opening 51 thus generating a dynamic maze.

The invention is not limited to the embodiments described above, which can be varied in a number of ways within the scope of the claims. E.g., (part of) the nozzles can be arranged to jet liquid at an inclination.

The invention claimed is:

1. A fountain, comprising:
    a floor;
    a reservoir for a liquid;
    a plurality of nozzles; and
    the floor including a plurality of floor modules,
        wherein each of the floor modules includes a tile, at least one nozzle of the plurality of nozzles and at least one pump,
        wherein the at least one pump is connected to the tile between the tile and the reservoir,
        wherein the tile has a floor side and a pump side, and
        wherein the at least one pump is mounted to the pump side of the tile and fluidly connected to the at least one nozzle.

2. The fountain according to claim 1, wherein the fountain is mobile.

3. The fountain according to claim 1, wherein the at least one nozzle of the plurality of the nozzles is supplied with liquid from the reservoir by the at least one pump.

4. The fountain according to claim 1, wherein user engageable top surfaces of the floor modules are either concave or convex.

5. The fountain according to claim 4, wherein the user engageable top surfaces are conical.

6. The fountain according to claim 1, wherein the floor modules comprise conductors.

7. The fountain according to claim 6, wherein the conductors extend through the floor modules to establish electrical connections between the floor modules.

8. The fountain according to claim 1, comprising a supporting frame provided with recesses for the floor modules, wherein the recesses are adapted to circumferences of the floor modules, and
wherein the floor modules comprise at least one part for mutually coupling the floor modules.

9. The fountain according to claim 1, wherein the floor modules are provided with a part for adjusting a user engageable top surface of the floor modules to be horizontal.

10. The fountain according to claim 1, wherein the at least one pump is an electric pump and wherein the fountain comprises a control system that is configured to, during operation of the fountain, control an amount of liquid jetted by the plurality of nozzles by varying at least one of electrical current, voltage, and frequency.

11. The fountain according to claim 1, wherein the reservoir is positioned underneath the floor.

12. The fountain according to claim 11, wherein the reservoir extends underneath the floor completely.

13. The fountain according to claim 1, comprising a sensor arranged to detect at least one of presence and position of an object on the floor.

14. The fountain according to claim 1, wherein at least one of the floor modules and the nozzles are provided in at least one of a two- or three-dimensional pattern.

15. The fountain according to claim 1, wherein the fountain comprises a control system configured to jet liquid from the nozzles to generate a moving wall.

16. The fountain according to claim 1, wherein the fountain comprises a control system configured to jet liquid from the nozzles to generate an enclosure.

17. The fountain according to claim 1, wherein all of the nozzles of the fountain are each supplied with liquid from the reservoir via the at least one pump of the corresponding floor module.

18. The fountain according to claim 1, wherein the at least one pump is an individually controllable pump.

19. The fountain according to claim 1, comprising one sensor per nozzle, and wherein each sensor is arranged to detect at least one of presence and position of an object on the floor.

20. The fountain according to claim 1, wherein the floor modules are provided in a grid comprising a plurality of rows and columns.

21. A fountain, comprising:
a reservoir having a lower surface and walls configured to hold a body of liquid; and
a floor assembly configured to provide a floor above an upper surface of the body of liquid comprised of a plurality of floor modules, wherein each of the floor modules is disposed within the walls of the reservoir and includes:
a tile supported above the upper surface of the body of liquid forming a portion of the floor; and
at least one nozzle and at least one pump connected to each respective tile to move with the tile,
wherein the at least one pump is configured to have an inlet below the upper surface of the body of liquid,
wherein the tile has a floor side and a pump side, and
wherein the at least one pump is mounted to the pump side of the tile and fluidly connected to the at least one nozzle.

22. A modular floor system comprising:
a first floor module comprising:
a first tile with a floor side and a pump side;
at least one first nozzle;
at least one first pump mounted to the pump side of the first tile and fluidly connected to the at least one first nozzle; and
a first conduit connected to the at least one first pump and having an open end configured to receive liquid from a body of water when the first floor module is placed in the body of water; and
a second floor module comprising:
a second tile having a floor side and a pump side and disposed adjacent the first tile of the first floor module, wherein an edge of the second tile is complementary to an edge of the first tile of the first floor module so the floor side of the second tile and the floor side of the first tile of the first floor module provide a continuous floor;
at least one second nozzle; and
at least one second pump mounted to the pump side of the second tile and fluidly connected to the at least one second nozzle; and
a second conduit connected to the at least one second pump with an open end configured to receive liquid from the body of water when the second floor module is placed in the body of water, wherein the open end of the second conduit is separate from the open end of the first conduit of the first floor module.

* * * * *